United States Patent
Matsuo

(10) Patent No.: US 10,387,277 B2
(45) Date of Patent: *Aug. 20, 2019

(54) ELECTRONIC EQUIPMENT INCLUDING STORAGE DEVICE

(71) Applicant: TOSHIBA MEMORY CORPORATION, Minato-ku (JP)

(72) Inventor: Kiyotaka Matsuo, Fujisawa (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/920,799

(22) Filed: Mar. 14, 2018

(65) Prior Publication Data

US 2018/0203772 A1 Jul. 19, 2018

Related U.S. Application Data

(63) Continuation of application No. 13/935,749, filed on Jul. 5, 2013, now Pat. No. 9,952,945.

(60) Provisional application No. 61/804,435, filed on Mar. 22, 2013.

(51) Int. Cl.
*G06F 11/20* (2006.01)

(52) U.S. Cl.
CPC ........ *G06F 11/2007* (2013.01); *G06F 11/201* (2013.01)

(58) Field of Classification Search
CPC ............. G06F 11/2002; G06F 11/2005; G06F 11/2007; G06F 11/201
See application file for complete search history.

(56) References Cited

U.S. PATENT DOCUMENTS

| 7,171,500 B2 | 1/2007 | Day et al. |
| 7,584,319 B1* | 9/2009 | Liao ............... G06F 13/4022 370/357 |
| 7,668,925 B1 | 2/2010 | Liao et al. |

(Continued)

FOREIGN PATENT DOCUMENTS

| JP | 2007-34438 | 2/2007 |
| JP | 2010-506332 | 2/2010 |

(Continued)

OTHER PUBLICATIONS

Serial Attached SCSI (SAS) Interface Manual, Seagate, May 2006.

(Continued)

*Primary Examiner* — Tim T Vo
*Assistant Examiner* — Phong H Dang
(74) *Attorney, Agent, or Firm* — Oblon, McClelland, Maler & Neustadt, L.L.P.

(57) ABSTRACT

According to one embodiment, a storage device includes a nonvolatile memory, controller and interface. The nonvolatile memory stores data. The controller controls the operation of the nonvolatile memory. The interface includes first and second input/output units that transmit and receive a signal with respect to a host device. The first and second input/output units are set on the first hierarchy having the same communication function. The interface issues a connection request to the first input/output unit and when the connection request to the first input/output unit is rejected, the interface issues the connection request to the second input/output unit.

18 Claims, 12 Drawing Sheets

(56) References Cited

U.S. PATENT DOCUMENTS

| | | |
|---|---|---|
| 8,181,078 B2 | 5/2012 | Stenfort |
| 8,301,810 B2 | 10/2012 | Pang et al. |
| 8,560,746 B2 | 10/2013 | Honjo et al. |
| 8,788,736 B2 | 7/2014 | McKay et al. |
| 8,856,392 B2 | 10/2014 | Myrah et al. |
| 9,026,704 B2 | 5/2015 | More |
| 9,129,068 B2 | 9/2015 | Yendigiri et al. |
| 2004/0190554 A1 | 9/2004 | Galloway |
| 2006/0031612 A1 | 2/2006 | Bashford et al. |
| 2006/0230125 A1 | 10/2006 | Johnson |
| 2007/0005833 A1 | 1/2007 | Seto |
| 2007/0005862 A1* | 1/2007 | Seto ............... G06F 13/4027 710/300 |
| 2007/0022227 A1 | 1/2007 | Miki |
| 2008/0162987 A1 | 7/2008 | El-Batal |
| 2009/0006697 A1 | 1/2009 | Doherty et al. |
| 2009/0017822 A1 | 1/2009 | Kim |
| 2011/0113176 A1* | 5/2011 | Johnson ............ G06F 11/2007 710/300 |
| 2012/0030385 A1 | 2/2012 | Yoshimura |
| 2012/0151101 A1 | 6/2012 | Matsuo et al. |
| 2012/0239789 A1 | 9/2012 | Ando et al. |
| 2012/0311197 A1 | 12/2012 | Larson et al. |
| 2014/0281282 A1 | 9/2014 | Kikuchi |

FOREIGN PATENT DOCUMENTS

| | | |
|---|---|---|
| JP | 2012-128560 | 7/2012 |
| JP | 2012-194807 | 10/2012 |

OTHER PUBLICATIONS

Serial Attached SCSI (SAS), <http://www.santrainingblog.com/2010/01/serial-attached-scsi/>, accessed on Aug. 2, 2016.

\* cited by examiner

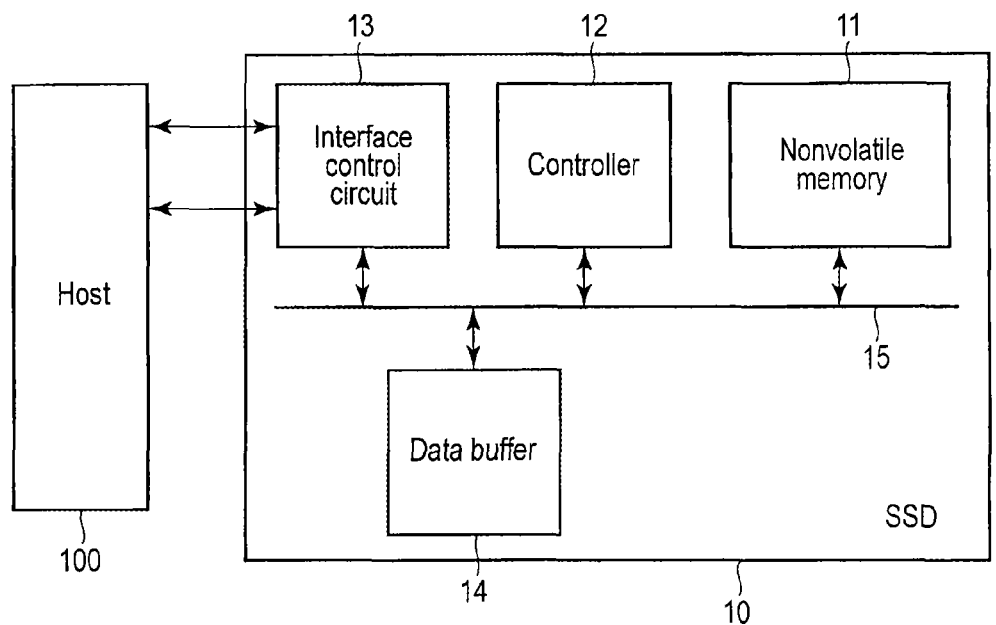
F I G. 1

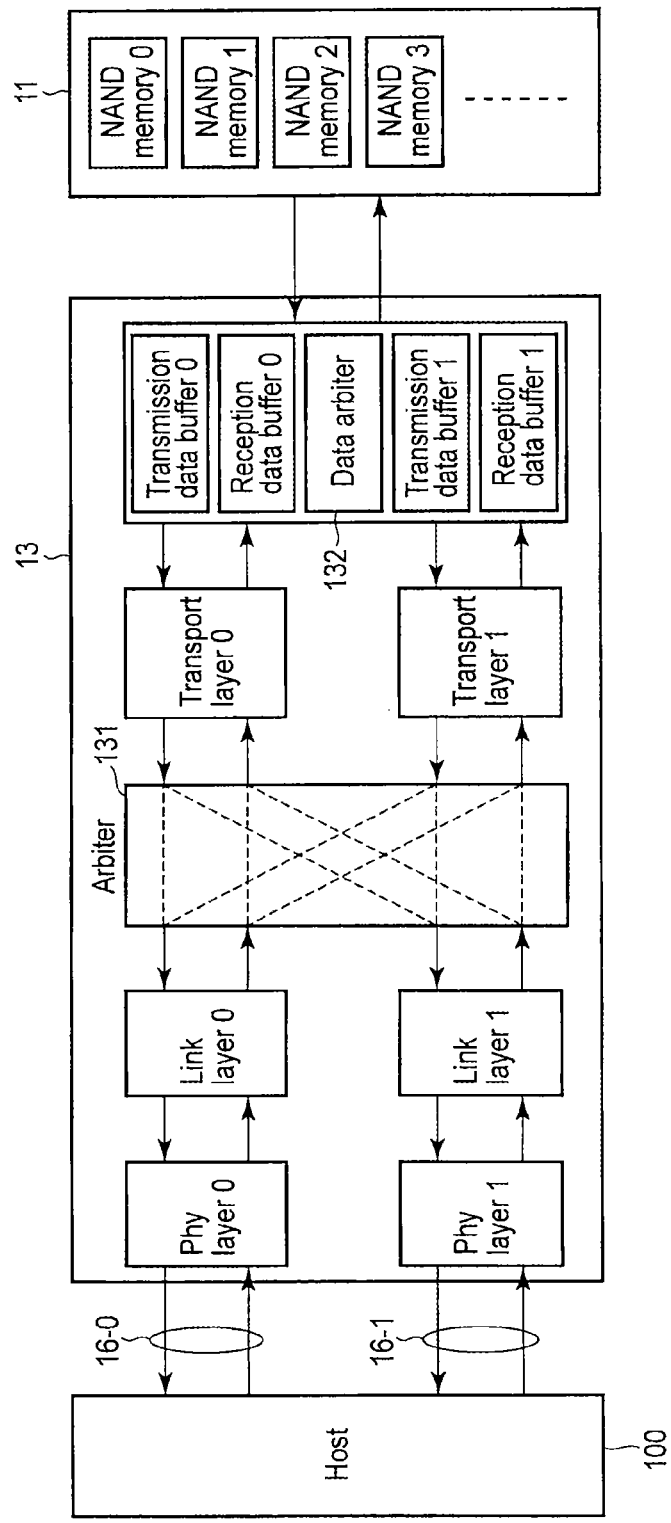
F I G. 2

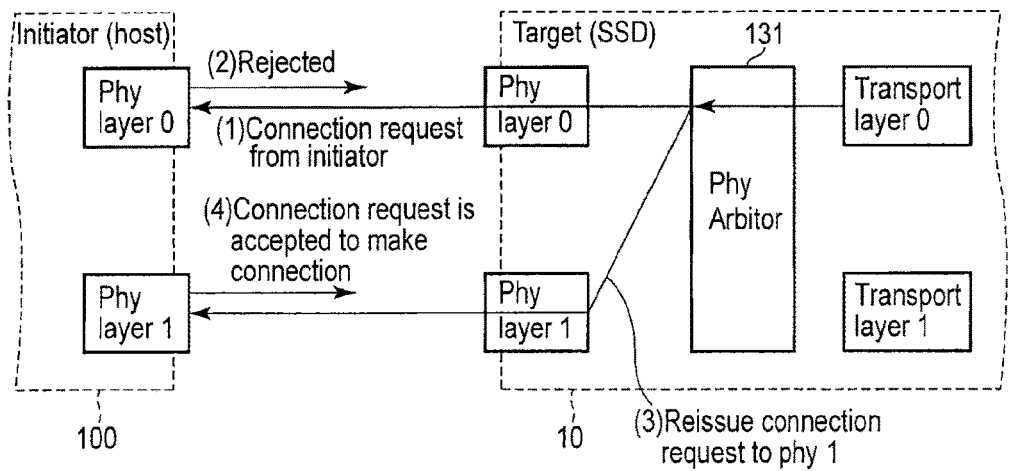
F I G. 5
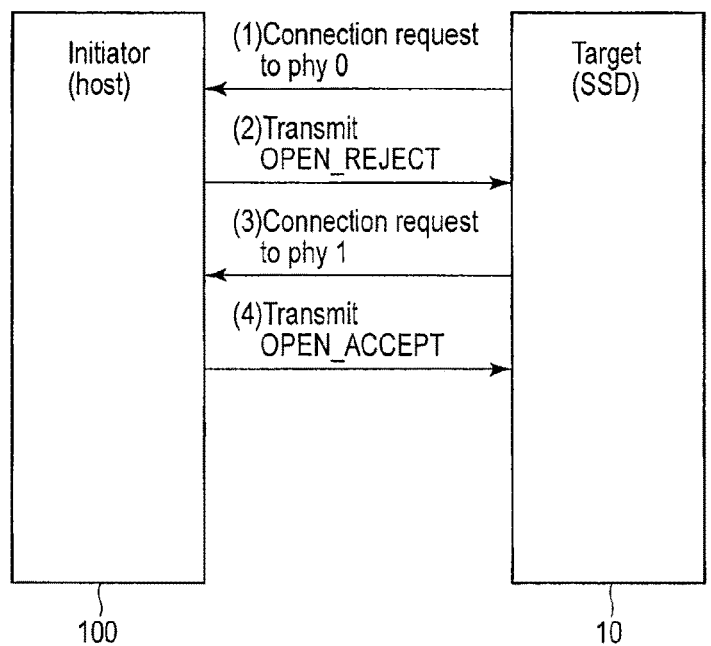
F I G. 6

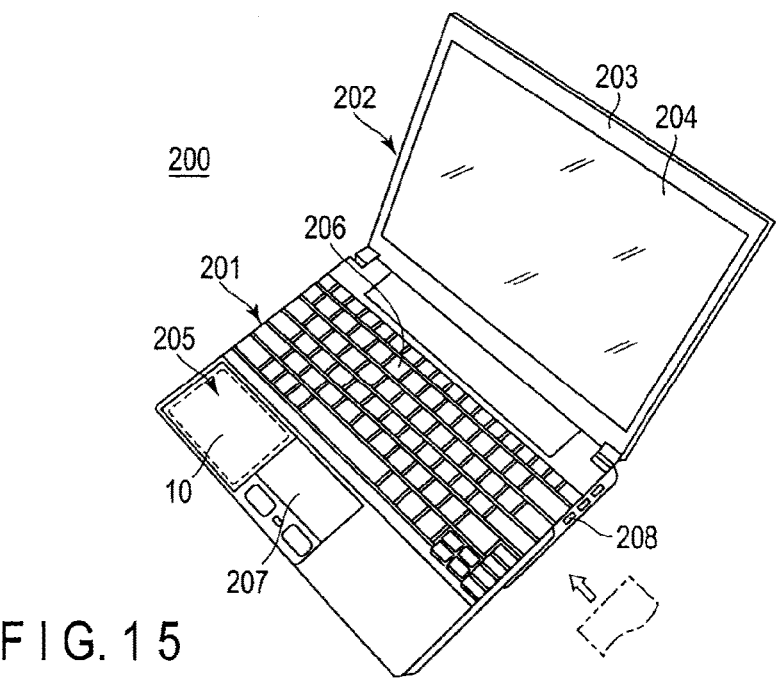
F I G. 15
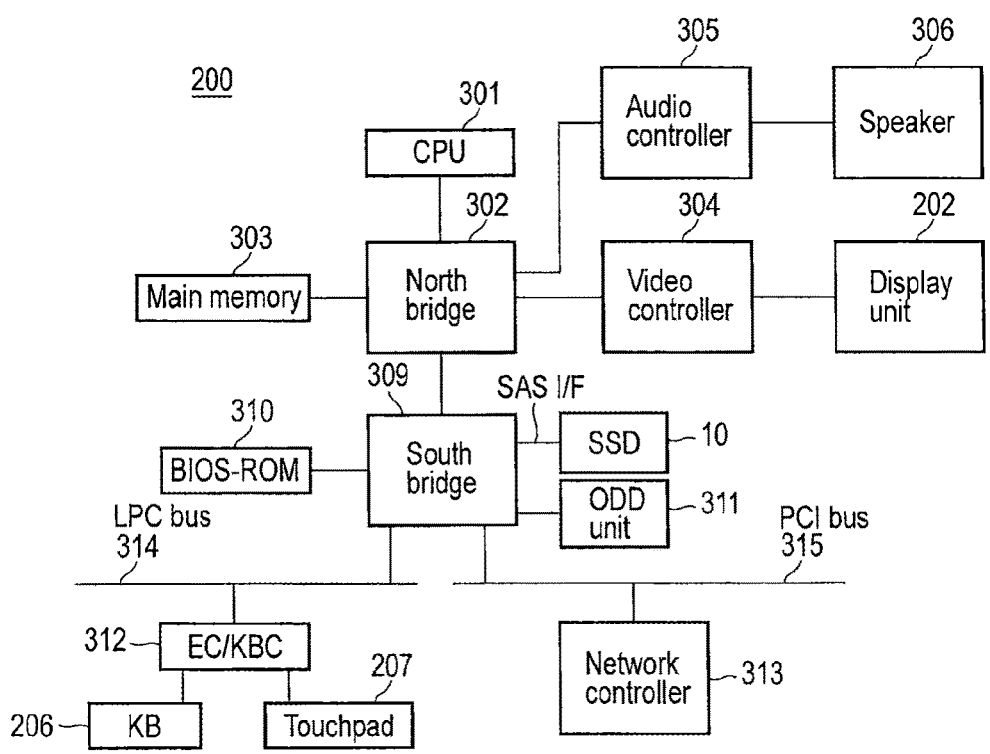
F I G. 16

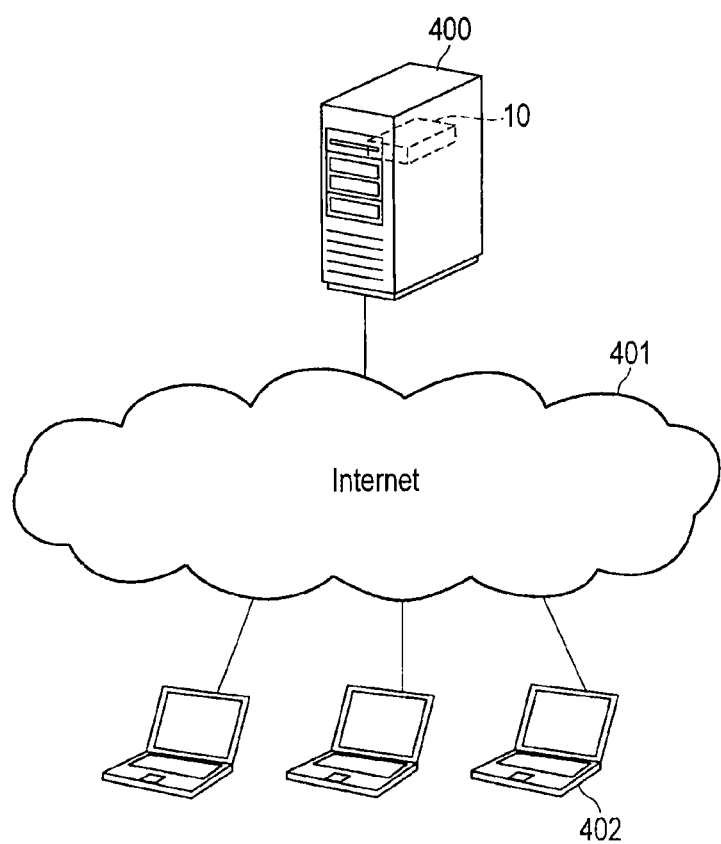
F I G. 17

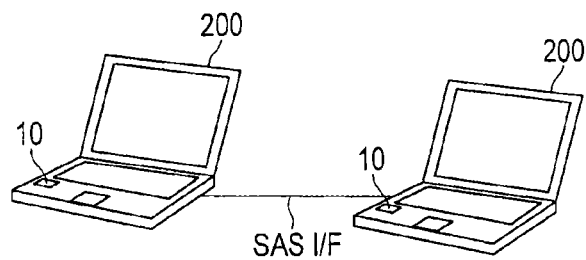
F I G. 1 8
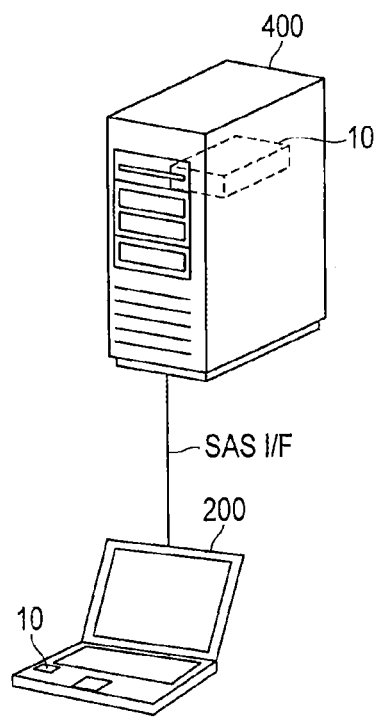
F I G. 1 9

ELECTRONIC EQUIPMENT INCLUDING STORAGE DEVICE

CROSS-REFERENCE TO RELATED APPLICATIONS

This application is a continuation of U.S. application Ser. No. 13/935,749 filed Jul. 5, 2013, and claims the benefit of U.S. Provisional Application No. 61/804,435, filed Mar. 22, 2013, the entire contents of each of which are incorporated herein by reference.

FIELD

Embodiments described herein relate generally to an electronic equipment including a storage device that includes a nonvolatile memory.

BACKGROUND

Recently, a storage device including a NAND flash memory (hereinafter referred to as a NAND memory) as a nonvolatile memory, for example, a solid-state drive (SSD) system is widely used in electronic equipment or the like.

The communication speed between an SSD and an initiator required for the SSD is higher than the communication speed between a hard disk drive (HDD) and an initiator and the communication speed is an extremely important factor in enhancing the performance. As a method for increasing the communication speed between the SSD and the initiator, a method for forming a Serial Attached SCSI (SAS) interface in a Wide Link form is provided. A plurality of signals can be simultaneously transferred by physically connecting the SSD and the initiator via a plurality of SAS cables.

In the SAS interface formed in the Wide Link form, two sets of phy/link/port/transport layers are provided in each port. Transmission data generated in one of the transport layers can be transmitted from a desired one of the phy layers and reception data to be transferred to one of the transport layers can be received from a desired one of the phy layers. It is extremely important how to efficiently use the phy layers provided two for each port.

BRIEF DESCRIPTION OF THE DRAWINGS

FIG. 1 is a block diagram showing the configuration of an SSD of one embodiment.

FIG. 2 is a block diagram showing the configuration of an interface control circuit and nonvolatile semiconductor memory in the SSD of the present embodiment.

FIGS. 5 and 6 are diagrams showing transfer of a signal between a host and an interface control circuit in a first embodiment.

FIG. 15 is a perspective view showing one example of a personal computer having an SSD of a fifth embodiment mounted thereon.

FIG. 16 is a block diagram showing a configuration example of the personal computer having the SSD of the fifth embodiment mounted thereon.

FIG. 17 is a conceptual view showing a usage example of a server having the SSD of the fifth embodiment mounted thereon.

FIG. 18 is a conceptual view showing a connection between personal computers each having the SSD of the fifth embodiment mounted thereon.

FIG. 19 is a conceptual view showing a connection between a server and a personal computer having the SSD of the fifth embodiment mounted thereon.

DETAILED DESCRIPTION

Figure 3:
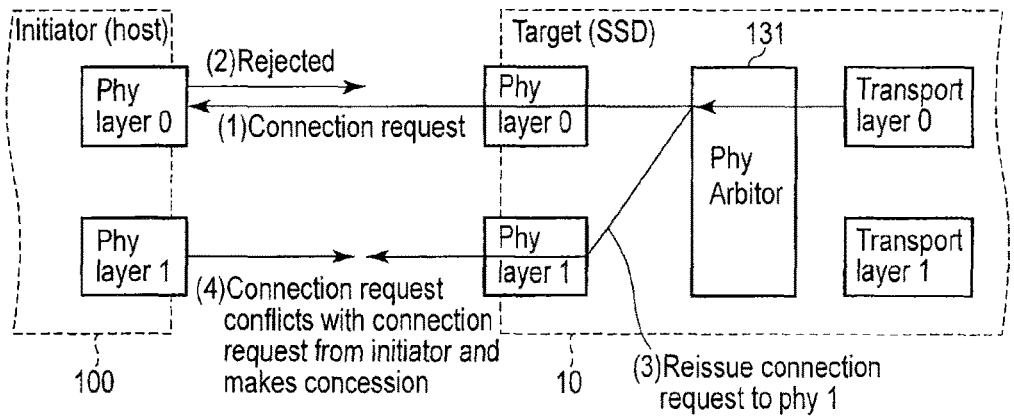
FIGS. 3 and 4 are diagrams each showing an obstruct occurring when a connection is made in an SAS interface standard.

The embodiment is explained below with reference to the drawings. In this embodiment, a case wherein a solid-state drive (SSD) is provided as a storage device, for example, is explained. Further, electronic equipment including a storage device is taken as an example and is explained. In the following explanation, the same symbols are attached to constituents having the same function and configuration and the explanation thereof is made only when necessary.

In general, according to one embodiment, a storage device includes a nonvolatile memory, controller and interface. The nonvolatile memory stores data. The controller controls the operation of the nonvolatile memory. The interface includes first and second input/output units that transmit and receive a signal with respect to a host device. The first and second input/output units are set on the first hierarchy having the same communication function. The interface issues a connection request to the first input/output unit and when the connection request to the first input/output unit is rejected, the interface issues the connection request to the second input/output unit.

A solid-state drive (SSD) of one embodiment is explained.

FIG. 1 is a block diagram showing the configuration of an SSD of one embodiment.

A solid-state drive (SSD) 10 is connected to a host device (hereinafter referred to as a host) 100, for example, a personal computer, server or the like, via a communication interface conforming to the Serial Attached SCSI (SAS) standard. For example, the SSD 10 functions as an external storage device of the host 100.

The SSD 10 includes a nonvolatile memory 11, controller 12, interface control circuit 13, data buffer 14 and the like. A bus 15 mutually and electrically connects the nonvolatile memory 11, controller 12, interface control circuit 13 and data buffer 14.

The nonvolatile memory 11 is read/written by use of the host 100 and holds data even when the power is not supplied thereto. The nonvolatile memory 11 includes a nonvolatile semiconductor memory, for example, a NAND flash memory (hereinafter referred to as a NAND memory). The nonvolatile semiconductor memory is not limited to a NAND flash memory but may include another nonvolatile semiconductor memory, for example, a NOR flash memory, magnetic random access memory (MRAM), resistive random access memory (ReRAM) or the like. Further, the nonvolatile semiconductor memory may include a single package having a single or a plurality of semiconductor chips provided therein or a plurality of packages each having a single or a plurality of semiconductor chips provided therein. Further, the nonvolatile semiconductor memory may be a flip chip with a single semiconductor chip. The nonvolatile memory 11 may be still another nonvolatile memory, for example, a magnetic disk, magnetic card, magnetic drum or the like.

The controller 12 controls the operation of the whole SSD including the interface control circuit 13, nonvolatile memory 11, data buffer 14 and the like according to a signal input from the host 100 via the interface control circuit 13 and a control program stored in the nonvolatile memory 11 and data buffer 14.

The interface control circuit 13 transfers a signal between the host 100 and the SSD 10. Transmission and reception of a signal with respect to the host 100 in the interface control circuit 13 is explained later.

The data buffer 14 is used when transfer data with respect to the host 100 and nonvolatile memory 11 is temporarily stored, for example. Further, the data buffer 14 is also used for caching data and storing management information of the nonvolatile memory 11. For example, the data buffer 14 includes a DRAM, SRAM or the like.

Data transmitted from the host 100 to the interface control circuit 13 is temporarily stored in the data buffer 14 under the control of the controller 12. Then, the data is transferred from the data buffer 14 and written to the NAND memory in the nonvolatile memory 11. On the other hand, data read from the NAND memory in the nonvolatile memory 11 is temporarily stored in the data buffer 14. Then, the data is transferred from the data buffer 14 to the host 100 via the interface control circuit 13.

FIG. 2 is a block diagram showing the configuration of the interface control circuit 13 and nonvolatile memory 11 in the SSD of the present embodiment.

As shown in FIG. 2, the interface control circuit 13 is connected to the host 100 by means of a communication interface of a Serial Attached SCSI (SAS) standard. Each of the interface control circuit 13 and host 100 includes ports (wide ports). The ports of the interface control circuit 13 and host 100 are connected by means of SAS cables 16-0 and 16-1.

The interface control circuit 13 includes phy layers 0 and 1, link layers 0 and 1, arbiter 131, transport layers 0 and 1, transmission data buffers 0 and 1, reception data buffers 0 and 1, and data arbiter 132.

SAS cable 16-0 is connected to phy layer 0 and phy layer 0 is sequentially connected to link layer 0, arbiter 131, transport layer 0, data arbiter 132, transmission data buffer 0 and reception data buffer 0.

SAS cable 16-1 is connected to phy layer 1 and phy layer 1 is sequentially connected to link layer 1, arbiter 131, transport layer 1, data arbiter 132, transmission data buffer 1 and reception data buffer 1.

Each of phy layers 0 and 1 adjusts (interfaces) a connection between the link layer and the physical layer. Each of phy layers 0 and 1 includes hardware such as a transceiver or receiver, a signal encoder system for transmitting and receiving a signal or the like and transmits and receives a signal that is formed in a serial form on a signal line.

Each of link layers 0 and 1 adjusts (interfaces) a connection between the arbiter (or transport layer) and the phy layer. Each of link layers 0 and 1 defines primitives, address frames and the like. Each of link layers 0 and 1 may define and manage the connection.

The arbiter 131 includes an arbitration circuit and controls the connection between link layers 0 and 1 and transport layers 0 and 1 according to control information. The control information includes previously stored information, for example, a protocol of the SAS, information received from phy layers 0 and 1 and the like. The control information is stored in the interface control circuit 13. The interface control circuit 13 includes a storage unit and may hold the control information in the storage unit. The arbiter 131 may be included in link layers 0 and 1.

Each of transport layers 0 and 1 defines a format of a frame. Each of transport layers 0 and 1 converts information such as a command, data, status or the like into a frame and transfers the same to the arbiter 131. Further, each of transport layers 0 and 1 divides a frame received from the arbiter 131 into a command, data, status and the like and transfers the same to an upper application layer (not shown).

SAS cables 16-0 and 16-1 can transfer data or the like in parallel from the phy layer to the host 100 and from the host 100 to the phy layer.

Further, the nonvolatile memory 11 is connected to the interface control circuit 13. The nonvolatile memory 11 is subjected to a read/write operation by means of the controller 12 in response to an instruction from the host 100 to output data or store data input from the host 100. For example, the nonvolatile memory 11 includes a NAND memory 0, NAND memory 1, NAND memory 2, NAND memory 3, . . . .

Next, data transfer in the interface control circuit 13 in the SSD 10 is explained.

Data is read from the nonvolatile memory 11, transferred in the interface control circuit 13 and transmitted to the host 100. The data transfer operation of this case is as follows.

Data is read from the NAND memory in the nonvolatile memory 11 by means of the controller 12. Whether the read data is stored in the transmission data buffer 0 or transmission data buffer 1 is arbitrated by means of the data arbiter 132.

For example, data stored in the transmission data buffer 0 is transferred to transport layer 0 and converted into a frame by means of transport layer 0. The frame is transferred to the arbiter 131.

The arbiter 131 arbitrates whether the received frame is transferred to link layer 0 or link layer 1 according to the control information. For example, the frame transferred to link layer 0 is transferred to phy layer 0 and then transmitted from phy layer 0 to the host 100. Further, the frame transferred to link layer 1 is transferred to phy layer 1 and then transmitted from phy layer 1 to the host 100.

For example, data stored in the transmission data buffer 1 is transferred to transport layer 1 and converted into a frame by means of transport layer 1. The frame is transferred to the arbiter 131.

The arbiter 131 arbitrates whether the received frame is transferred to link layer 1 or link layer 0 according to the control information. For example, the frame transferred to link layer 1 is transferred to phy layer 1 and then transmitted from phy layer 1 to the host 100. Further, the frame transferred to link layer 0 is transferred to phy layer 0 and transmitted from phy layer 0 to the host 100.

When data is input to the interface control circuit 13 from the host 100, transferred in the interface control circuit 13 and written to the nonvolatile memory 11, then data transfer becomes as follows.

Data input to the interface control circuit 13 from the host 100 is input to phy layer 0 or phy layer 1.

For example, data input to phy layer 0 is transferred to the arbiter 131 via link layer 0. The arbiter 131 determines whether the received data is transferred to transport layer 0 or transport layer 1 according to the control information. For example, data transferred to transport layer 0 is converted to a frame by means of transport layer 0. The frame is transferred to the data arbiter 132 and whether the frame is stored in the reception data buffer 0 or reception data buffer 1 is determined by means of the data arbiter 132.

Further, data transferred to transport layer 1 is converted to a frame by means of transport layer 1. The frame is transferred to the data arbiter 132 and whether the frame is stored in the reception data buffer 1 or reception data buffer 0 is determined by means of the data arbiter 132. The frame stored in the reception data buffer 0 or reception data buffer 1 is stored in the NAND memory in the nonvolatile memory 11 by means of the controller 12.

For example, data input to phy layer 1 is transferred to the arbiter 131 via link layer 1. The arbiter 131 determines whether the received data is transferred to transport layer 1 or transport layer 0 according to the control information. For example, data transferred to transport layer 1 is converted to a frame by means of transport layer 1. The frame is transferred to the data arbiter 132 and whether the frame is stored in the reception data buffer 1 or reception data buffer 0 is determined by means of the data arbiter 132.

Further, data transferred to transport layer 0 is converted to a frame by means of transport layer 0. The frame is transferred to the data arbiter 132 and whether the frame is stored in the reception data buffer 0 or reception data buffer 1 is determined by means of the data arbiter 132. The frame stored in the reception data buffer 1 or reception data buffer 0 is stored in the NAND memory in the nonvolatile memory 11 by means of the controller 12.

Next, the connection between the transport layer and the phy layer via the arbiter 131 at the time of data reception/transmission between the interface control circuit 13 and the host 100 is explained. Generally, the host 100 is referred to as an initiator and the SSD 10 is referred to as a target. Next, problems occurring at the time of data reception/transmission between transport layers 0 and 1 and phy layers 0 and 1 are explained by taking cases 1 to 4 as examples. In the following explanation, the link layer is omitted.

The following obstructs occur when the connection is made in the SAS interface standard. In this case, "the connection is made" means that ACCEPT is returned from one of the target and initiator in response to a connection request issued from the other one of them and a connection is made or formed between the target and the initiator. The connection indicates a temporary connection between an SAS initiator port and an SAS target port.

a. The phy layer cannot be used b. A connection request from the target and a connection request from the initiator conflict with each other. There may sometimes occur a case wherein a connection request from the target and a connection request from the initiator are simultaneously issued to the same phy layer and the two connection requests conflict to make a connection with respect to the phy layer. In such a case, one of the connection requests is selected according to the previously defined priority order.

c. A connection request from the target is rejected by the initiator.

In the conventional SAS interface that is not formed in a Wide Link form, if the above phenomenon occurs when a connection is made, issuance of a connection request must be only kept retried with respect to one phy layer or a connection request must be withdrawn for a while.

However, in the SAS interface that is formed in the Wide Link form, even if the above phenomenon occurs in one of the phy layers, there is a possibility that a connection can be made in a short time by trying a connection again with respect to the other phy layer. It is an important factor that the process of handling connection requests for the two phy layers when the above phenomenon has occurred is optimized to realize more efficient communications.

Some phenomena that may occur by inefficiently handling connection requests are given.

A. Case 1

The arbiter 131 issued a connection request from transport layer 0 to phy layer 0 while the two phy layers 0 and 1 are vacant. However, the target received Retry-class OPEN_REJECT from the initiator. After this, the arbiter 131 repeatedly issues a connection request to phy layer 0. That is, issuance of a connection request to phy layer 0 is continuously retried.

If OPEN_REJECT is once received in response to a connection request, it takes some time until OPEN_ACCEPT can be received in the same phy layer after this and it becomes inefficient.

B. Case 2

The arbiter 131 issued a connection request from transport layer 0 to phy layer 0. However, the target received Retry-class OPEN_REJECT from the initiator. At this time, phy layer 1 is being connected to an object which transport layer 0 wants to transmit, but the arbiter 131 continuously retries to issue a connection request to phy layer 0.

Like case 1, if OPEN_REJECT is once received in response to a connection request, it takes some time until OPEN_ACCEPT can be received in the same phy layer after this and it becomes inefficient.

C. Case 3

As shown in FIG. 3, the arbiter 131 issued a connection request from transport layer 0 to phy layer 0 (1). However, the target received Retry-class OPEN_REJECT from the initiator (2). Next, the arbiter 131 reissued a connection request to phy layer 1 (3). However, since the connection request to phy layer 1 and the connection request from the initiator to phy layer 1 conflict with each other, the arbiter 131 preferentially made concession to the connection request from the initiator (4).

In this case, since a connection request issued from transport layer 0 is rejected even if the initiator that is a to-be-connected destination of phy layer 1 is an object which transport layer 0 wants to transmit, the arbiter 131 does not transmit data with respect to phy layer 1.

D. Case 4

Figure 4:
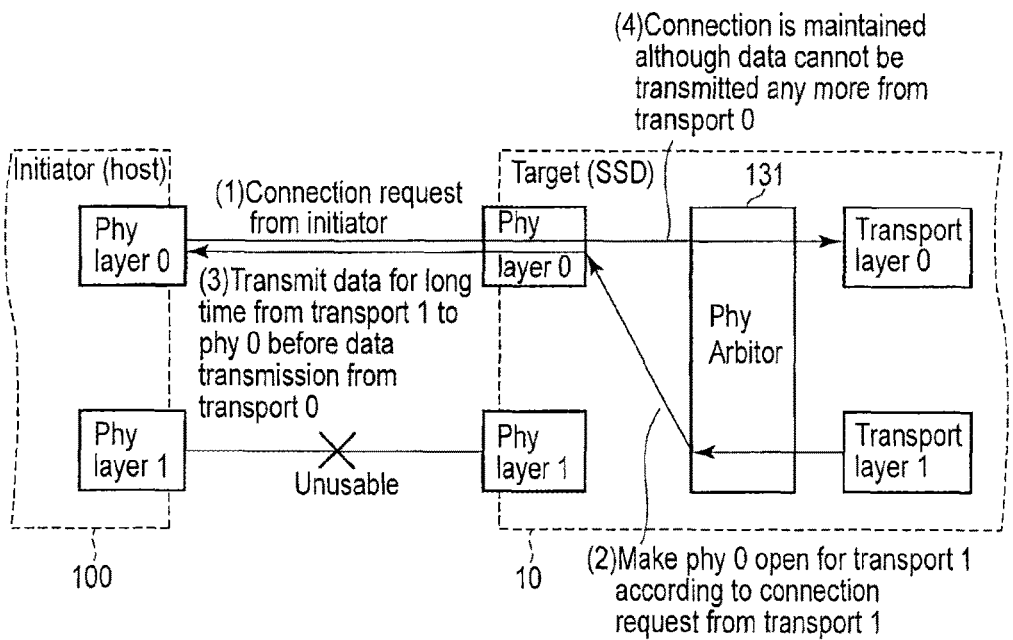

As shown in FIG. 4, phy layer 0 is making a connection with transport layer 0 according to a connection request from the initiator (1). Further, the initiator that is a to-be-connected destination of phy layer 0 is an object which transport layer 1 wants to transmit. Phy layer 1 is set in an unusable state.

In this state, since a connection request was issued from transport layer 1, the arbiter 131 released phy layer 0 to transport layer 1 (2) and transport layer 1 transmitted data to the initiator in phy layer 0 (3). Transport layer 0 wants to transmit data to an initiator that is different from a to-be-connected destination of phy layer 0, but the connection to phy layer 0 is not closed for a long time (4) (FIG. 4).

It is impossible to transmit data from both of transport layers 0 and 1 by use of the same connection. Since data transmission from transport layer 0 to phy layer 0 becomes impossible when data transmission from transport layer 1 to phy layer 1 is started, it is inefficient to keep the connection between phy layer 0 and transport layer 0.

The configurations for avoiding the problems occurring in above cases 1 to 4 are explained below with reference to the first to third embodiments.

First Embodiment

In the first embodiment, the configuration for avoiding the problem occurring in above case 1 is explained. Also, in this case, the host 100 is referred to as an initiator and the SSD 10 is referred to as a target.

FIGS. 5 and 6 are diagrams showing transfer of a signal between the host 100 and the interface control circuit 13 in the SSD 10 in the first embodiment.

First, the arbiter 131 issued a connection request from transport layer 0 to phy layer 0 (1). However, the target received Retry-class OPEN_REJECT from the initiator (2). In this case, the arbiter 131 temporarily gives up making a connection with respect to phy layer 0 in response to one reception of OPEN_REJECT and issues a connection request to phy layer 1, that is, tries to make a connection with phy layer 1 (3). Then, OPEN_ACCEPT is received from the initiator and a connection is made (4).

At this time, if Retry-class OPEN_REJECT is received from the initiator also with respect to phy layer 1 when a trial is made to make a connection with respect to phy layer 1, a trial is made again to make a connection with respect to phy layer 0. After this, if OPEN_REJECT is received, a trial is alternately made to make a connection with respect to phy layer 0 and phy layer 1.

As described above, the possibility of making a connection becomes strong in a case wherein two phy layers are positively utilized by alternately issuing a connection request to the two phy layers than in a case wherein a connection request is kept issued to only one phy layer. Further, it is possible to reduce the required time until the connection is made. With such a system, the phy layer can be efficiently utilized and the data communication speed can be increased.

Second Embodiment

In the second embodiment, the configuration for avoiding the problems occurring in above cases 2 and 3 is explained.

First, the configuration for avoiding the problem occurring in case 2 is explained below.

Figure 7:
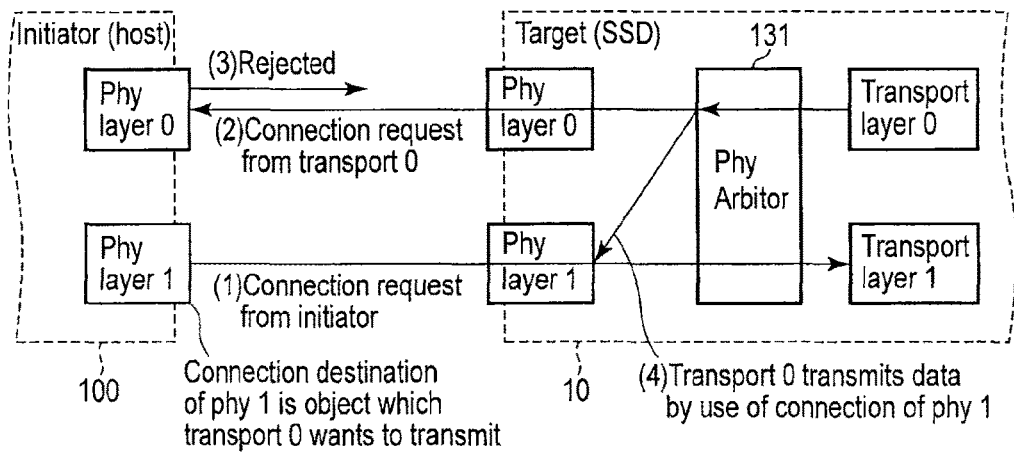
FIGS. 7, 8, 9 and 10 are diagrams showing transfer of a signal between a host and an interface control circuit in a second embodiment.
Figure 8:
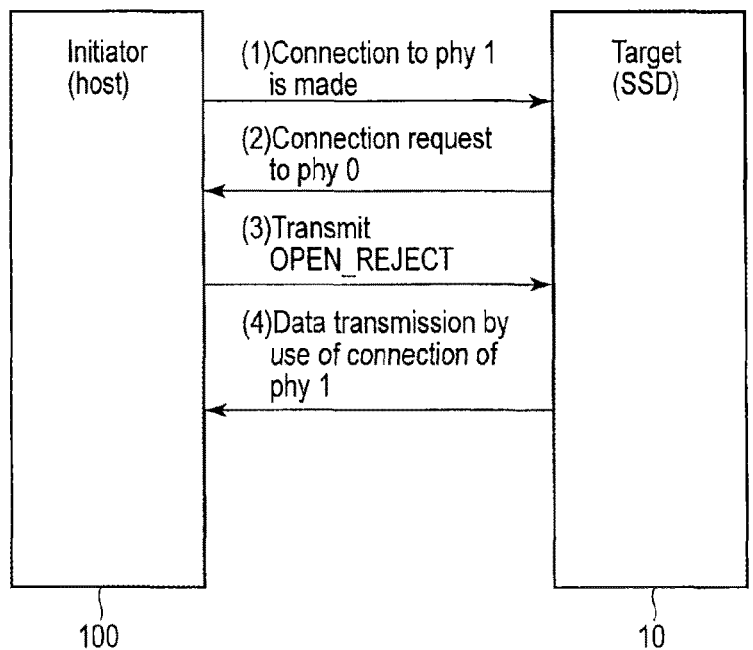

FIGS. 7 and 8 are diagrams showing transfer of a signal between a host 100 and an interface control circuit 13 in an SSD 10 for case 2 in the second embodiment.

A connection is made from phy layer 1 of an initiator to phy layer 1 of a target (1).

In this state, an arbiter 131 issued a connection request from transport layer 0 to phy layer 0 (2). At this time, the target received Retry-class OPEN_REJECT from the initiator (3).

Therefore, the arbiter 131 issued a connection request from transport layer 0 to phy layer 1. However, a connection is already made between phy layer 1 of the initiator and phy layer 1 of the target in response to a connection request from the initiator.

In such a case, the arbiter 131 transmits data to the initiator by use of the connection that is made with phy layer 1 without trying to make a connection with phy layer 0 again, that is, without making a retrial with respect to phy layer 0 (4). This is a case wherein the initiator of a to-be-connected destination of phy layer 1 is the object which transport layer 0 wants to transmit.

Next, the configuration for avoiding the problem occurring in case 3 is explained below.

Figure 9:
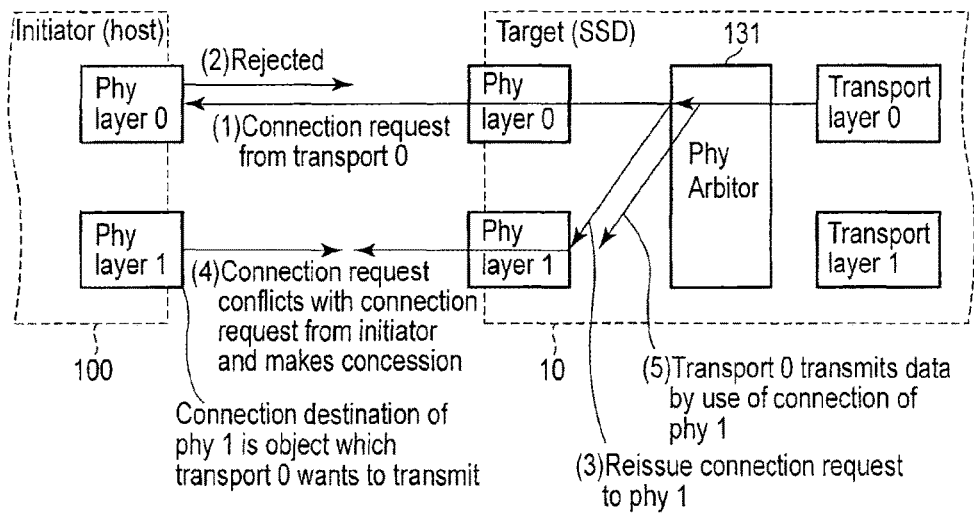
Figure 10:
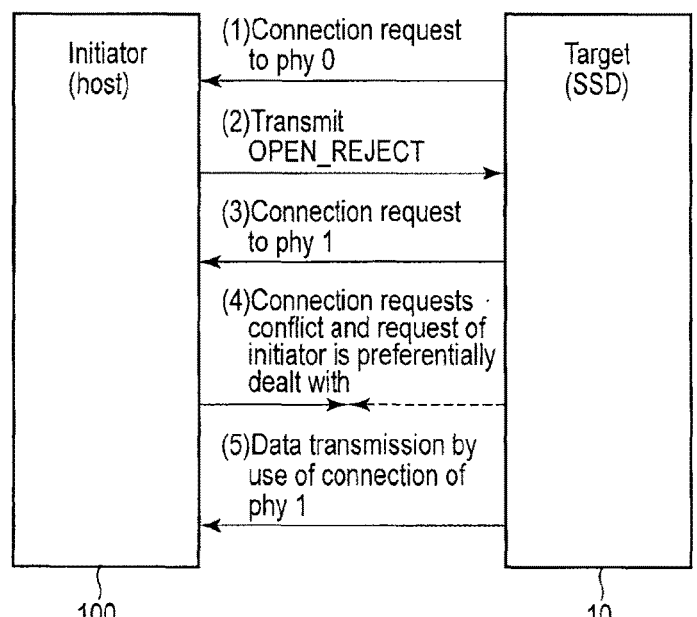

FIGS. 9 and 10 are diagrams showing transfer of a signal between the host 100 and the interface control circuit 13 in the SSD 10 for case 3 in the second embodiment.

First, the arbiter 131 issued a connection request from transport layer 0 to phy layer 0 (1). At this time, the target received Retry-class OPEN_REJECT from the initiator (2). Therefore, the arbiter 131 temporarily gives up making a connection with phy layer 0 and issues a connection request to phy layer 1, that is, tries to make a connection with phy layer 1 (3).

However, since the connection request to phy layer 1 and the connection request from the initiator conflict with each other, the arbiter 131 preferentially made concession to the connection request from the initiator (4).

In this case, if the initiator of a to-be-connected destination of phy layer 1 is the object which transport layer 0 wants to transmit, data is transmitted from transport layer 0 to the initiator by use of the connection of phy layer 1 that is already made although a connection request from transport layer 0 is not accepted (5).

Thus, when a connection request issued to one of the phy layers is rejected and a connection to the other phy layer is already made and if the to-be-connected destination of the phy layer to which the connection is made is an object which wants to transmit in the connection request, data is transmitted by use of the connection. According to this system, a connection can be more stably and efficiently made in comparison with a case wherein a connection request is kept issued to one phy layer, that is, a retrial to one phy layer is continuously made. Therefore, the phy layer can be efficiently utilized and the data communication speed can be increased.

Third Embodiment

In the third embodiment, the configuration for avoiding the problem occurring in above case 4 is explained.

Figure 11:
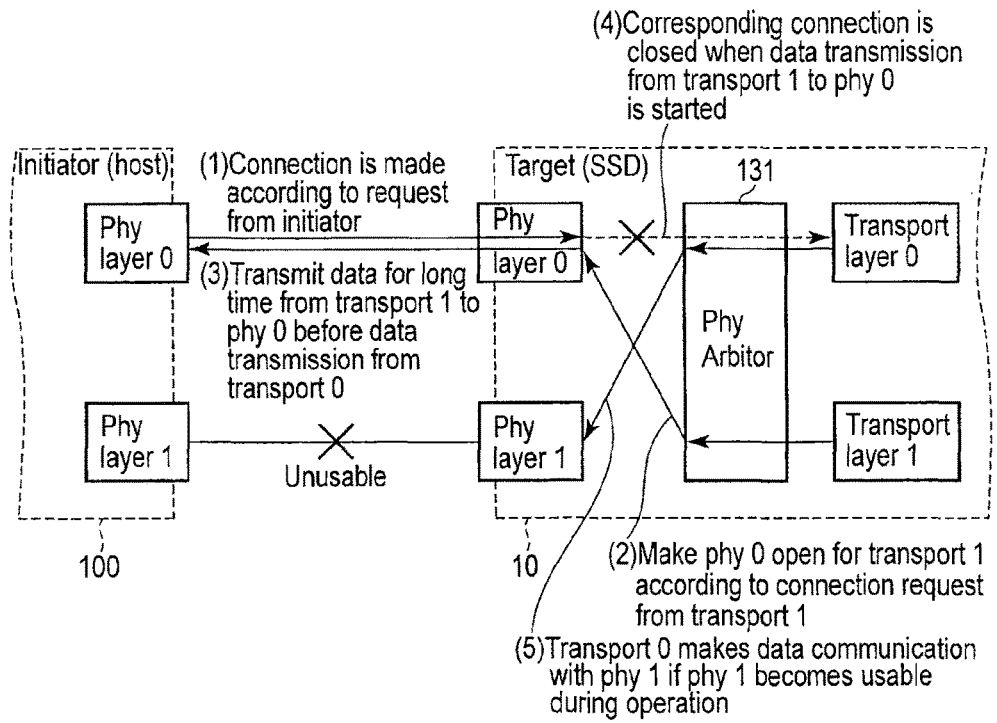
FIGS. 11 and 12 are diagrams showing transfer of a signal between a host and an interface control circuit in a third embodiment.
Figure 12:
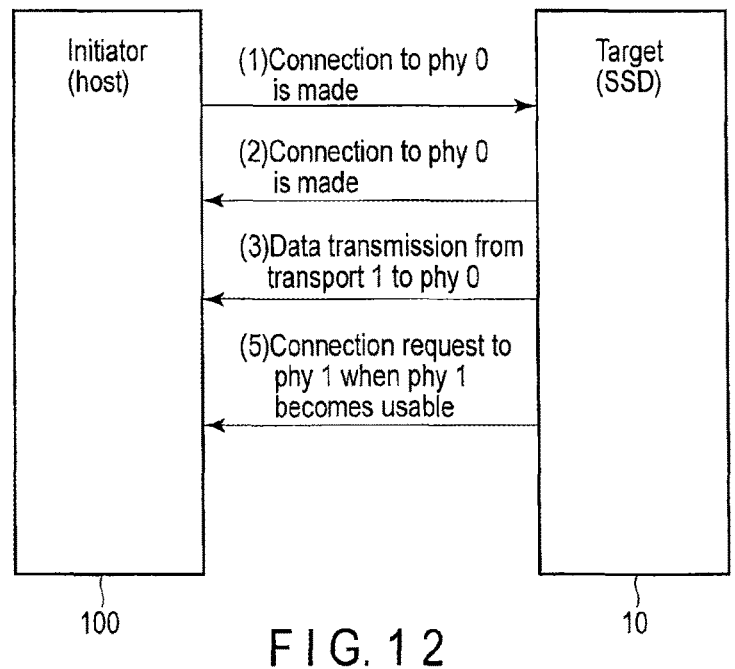

FIGS. 11 and 12 are diagrams showing transfer of a signal between a host 100 and an interface control circuit 13 in an SSD 10 in the third embodiment.

A connection is made between a phy layer 0 of an initiator and a phy layer 0 and transport layer 0 of a target according to a connection request from phy layer 0 of the initiator to phy layer 0 of the target (1). In this case, phy layer 1 is set in an unusable state.

In this state, since phy layer 1 cannot be used, an arbiter 131 issues a connection request from transport layer 1 to phy layer 0 to connect transport layer 1 and phy layer 0 (2).

As described before, in an SAS interface that is formed in a Wide Link form, data cannot be simultaneously transmitted from the two transport layers 0 and 1 on the same connection. When data transmission from transport layer 1 to phy layer 0 is started, it becomes impossible to transmit data from transport layer 0 to phy layer 0 on the connection (3).

At this time, transport layer 0 is set in the connected state even though transport layer 0 cannot transmit data to phy layer 0. Therefore, if data transmission from transport layer 1 to phy layer 0 is made over a long time, the communication from transport layer 0 is stagnated over a long time and becomes inefficient.

In order to solve this problem, the arbiter 131 closes the connection between phy layer 0 of the target and the arbiter 131 when data transmission from transport layer 1 to phy layer 0 is started (4). As a result, even if phy layer 1 becomes unusable in the middle course of the operation, there occurs a possibility that a connection can be made from transport layer 0 to phy layer 1 (5). Thus, the phy layer can be efficiently utilized and the data communication speed can be increased. The term "a connection is closed" means that a connection made between the target and the initiator is broken.

Fourth Embodiment

In the fourth embodiment, a process performed in the above embodiment is explained with reference to the flowchart.

The communication speed between the SSD and the initiator of the SAS interface that is formed in the Wide Link form is increased in the first to third embodiments. As described before, since the communication speed required in communicating with the initiator is higher in the SSD than in the HDD, the effect in each of the above embodiments becomes more significant in the SSD and the degree of significance in the embodiments becomes higher in the SSD.

As described before, various factors that obstruct a connection from being made in response to a connection request from the transport layer are provided.

Figure 13:
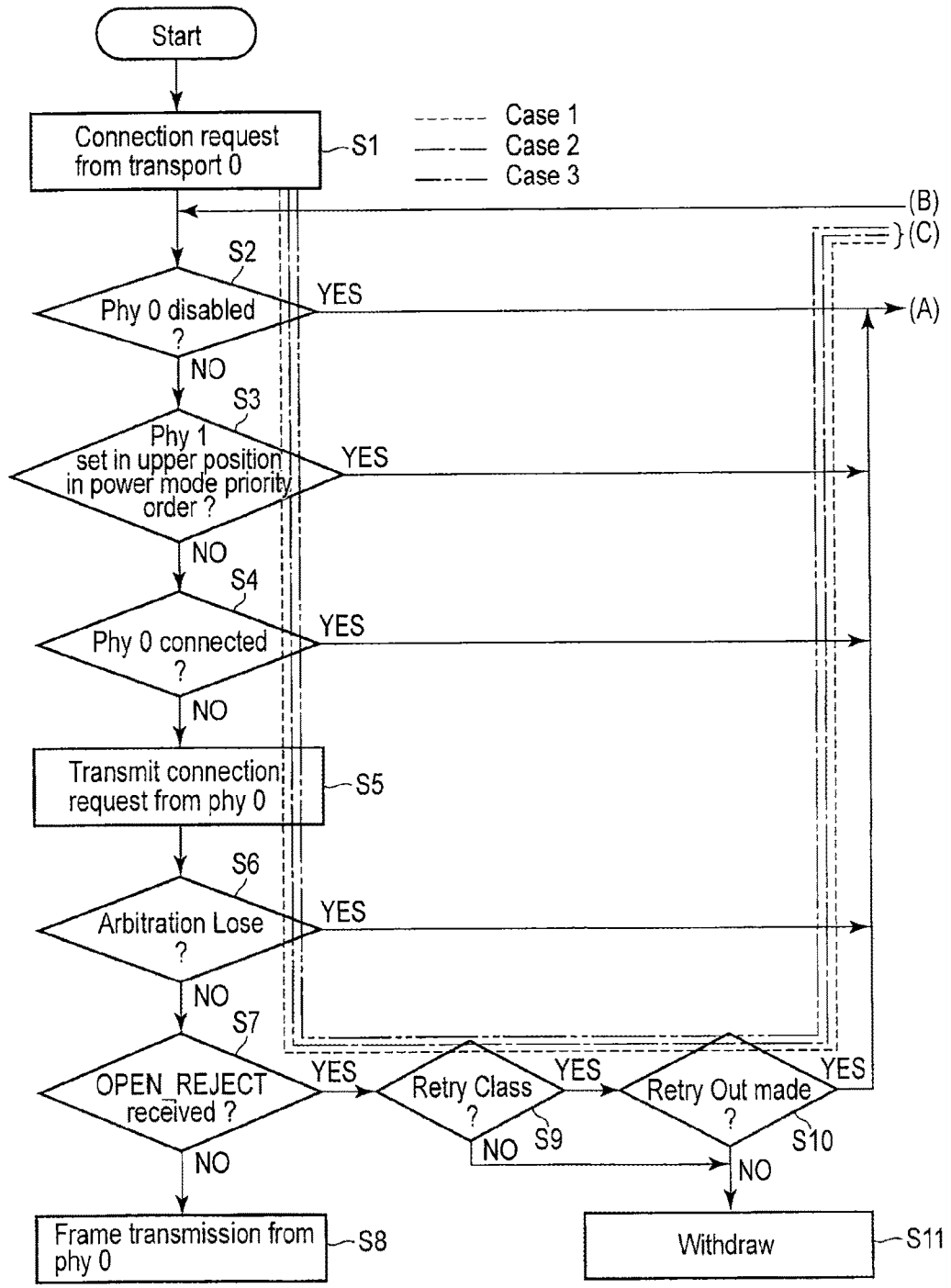
FIGS. 13 and 14 are flowcharts showing a process of an interface control circuit in a fourth embodiment.
Figure 14:
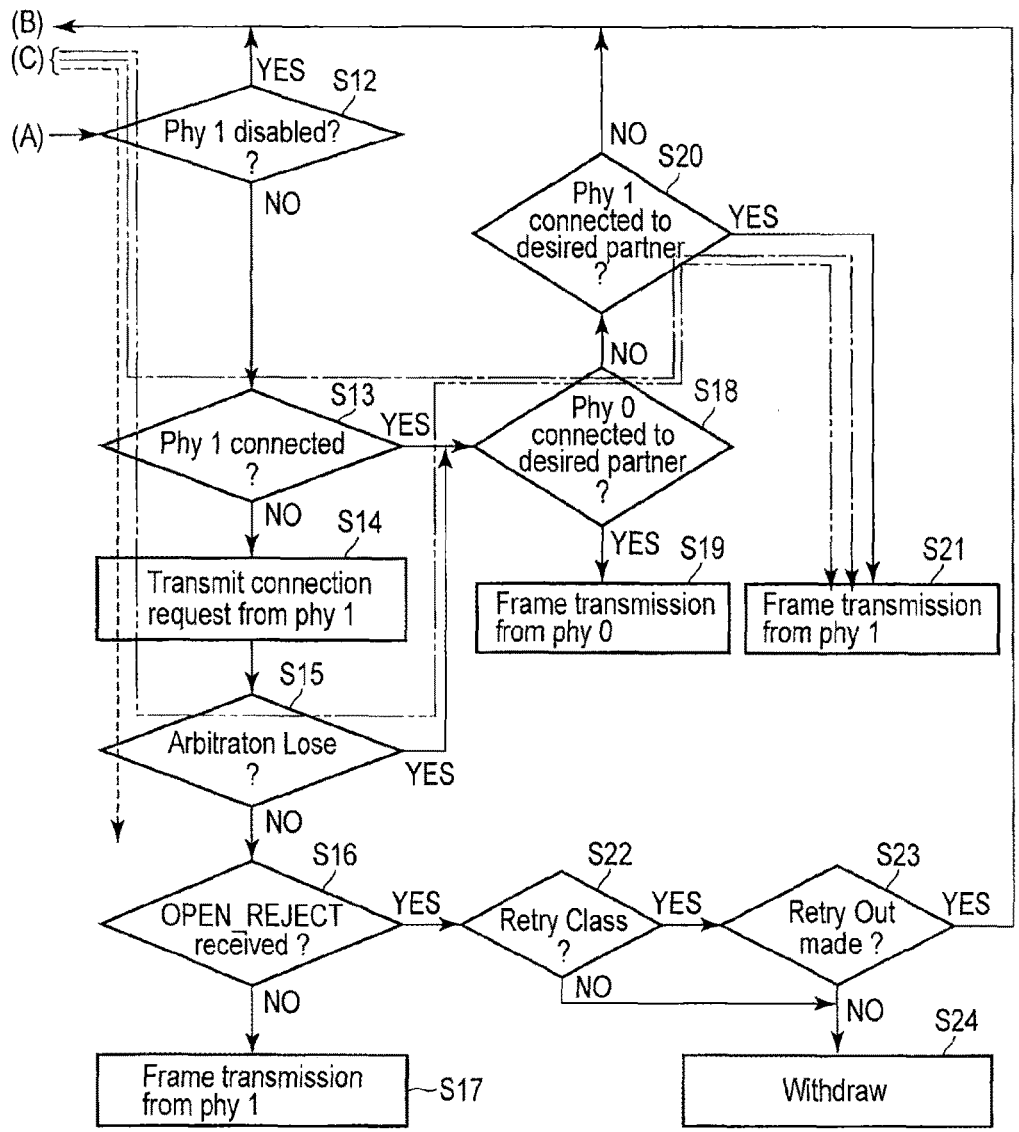

FIGS. 13 and 14 are flowcharts for illustrating how to allocate a connection request from a transport layer 0 to two phy layers 0 and 1 when the above factors occur. The routes corresponding to cases 1 to 3 described in the first and second embodiments are indicated by arrows in FIGS. 13 and 14. The process shown in FIGS. 13 and 14 is controlled by means of an interface control circuit 13 (for example, arbiter 131).

First, a connection request is issued from transport layer 0 of a target to phy layer 0 (step S1). Whether phy layer 0 is disabled (inhibited from being used) or not is determined (step S2). When phy layer 0 is not disabled, whether or not phy layer 1 is set in an upper position in the priority order of the power mode is determined (step S3).

If phy layer 1 is not set in the upper position in the power mode priority order, whether or not phy layer 0 is already connected, that is, whether or not a connection to phy layer 0 is established is determined (step S4). If phy layer 0 is not yet connected, a connection request is transmitted from phy layer 0 to the initiator (step S5).

Next, the connection request in step S5 conflicts with another connection request and whether the connection request in step S5 loses or not is determined by arbitration (arbitration lose) (step S6). A connection request from the target and a connection request issued from the initiator are simultaneously issued to the same phy layer and the two connection requests compete against each other for the connection to the phy layer in some cases. In such a case, one of the connection requests is selected according to the previously defined priority order.

If it is determined in step S6 that the connection request in step S5 does not lose, whether OPEN_REJECT is received or not is determined (step S7). If OPEN_REJECT is not received, a data frame is transmitted from phy layer 0 to the initiator (step S8).

On the other hand, if OPEN_REJECT is received in step S7, whether OPEN_REJECT is Retry Class or not is determined (step S9). If OPEN_REJECT is Retry Class, whether Retry Out is made or not is determined (step S10). Further, if it is determined in step S9 that OPEN_REJECT is not Retry Class and Retry Out is made in step S10, a connection request from transport layer 0 is withdrawn (step S11).

If Retry Out is not made in step S10, the process proceeds to step S12. Further, the process proceeds to step S12 also if phy layer 0 is disabled in step S2, if phy layer 1 is set in the upper position in the power mode priority order in step S3, if phy layer 0 is already connected in step S4 and if the connection request in step S5 loses in step S6.

In step S12, whether or not phy layer 1 is disabled (inhibited from being used) is determined. If phy layer 1 is not disabled, whether or not phy layer 1 is already connected, that is, whether or not a connection to phy layer 1 is made is determined (step S13).

If phy layer 1 is not yet connected, a connection request is transmitted from phy layer 1 to the initiator (step S14).

Next, the connection request in step S14 conflicts with another connection request and whether the connection request in step S14 loses or not is determined by arbitration (arbitration lose) (step S15). If it is determined that the connection request in step S14 does not lose, whether OPEN_REJECT is received or not is determined (step S16). If OPEN_REJECT is not received, a data frame is transmitted from phy layer 1 to the initiator (step S17).

On the other hand, if it is determined in step S13 that phy layer 1 is already connected, whether or not phy layer 0 is connected to an object which transport layer 0 wants to transmit is determined (step S18). If phy layer 0 is connected to the object which transport layer 0 wants to transmit, a data frame is transmitted from phy layer 0 to the initiator (step S19).

If it is determined in step S18 that phy layer 0 is not connected to the object which transport layer 0 wants to transmit, whether or not phy layer 1 is connected to the object which transport layer 0 wants to transmit is determined (step S20). If phy layer 1 is connected to the object which transport layer 0 wants to transmit, a data frame is transmitted from phy layer 1 to the initiator (step S21).

If OPEN_REJECT is received in step S16, whether OPEN_REJECT is Retry Class or not is determined (step S22). If OPEN_REJECT is Retry Class, whether Retry Out is made or not is determined (step S23). Further, if it is determined in step S22 that OPEN_REJECT is not Retry Class and Retry Out is made in step S23, a connection request from transport layer 0 is withdrawn (step S24).

If Retry Out is not made in step S23, the process returns to step S2 and the process after step S2 is repeatedly performed. Likewise, if phy layer 1 is disabled in step S12 and phy layer 1 is not connected to the object which transport layer 0 wants to transmit in step S20, the process returns to step S2 and the process after step S2 is repeatedly performed.

By the above process, a connection request from transport layer 0 is issued to phy layer 0 or 1 and a trial is made to make a connection by means of phy layer 0 or 1.

In the flowcharts shown in FIGS. 13, 14, the flow of the process of cases 1 to 3 in the first and second embodiments becomes as follows.

The process of case 1 in the first embodiment is performed in the order of steps S1 to S7, S9, S10 and S12 to S17 as indicated by dotted lines. The process of case 2 in the second embodiment is performed in the order of steps S1 to S7, S9, S10, S12, S13, S18, S20 and S21 as indicated by single-dot-dash lines. Further, the process of case 3 in the second embodiment is performed in the order of steps S1 to S7, S9, S10, S12, S13, S14, S15, S18, S20 and S21 as indicated by double-dot-dash lines.

Fifth Embodiment

In the fifth embodiment, first to fourth application examples using the above SSD are explained.

FIG. 15 is a perspective view showing one example of a personal computer having an SSD of the first application example mounted thereon.

A personal computer 200 includes a main body 201 and a display unit 202. The display unit 202 includes a display housing 203 and a display device 204 received in the display housing 203.

The main body 201 includes a casing 205, keyboard 206, and a touchpad 207 that is a pointing device. A main circuit board, optical disk drive (ODD) unit, card slot, SSD 10 and the like are received in the internal portion of the casing 205.

The card slot is provided adjacent to the peripheral wall of the casing 205. In the peripheral wall, opening portion 208 facing the card slot is formed. The user can detachably insert an additional device into the card slot from the exterior of the casing 205 via the opening portion 208.

The SSD 10 may be used in a state in which it is provided in the personal computer 200 in place of the conventional hard disk drive (HDD) or may be used as an additional device in a state in which it is inserted in the card slot provided in the personal computer 200.

FIG. 16 is a block diagram showing a configuration example of the personal computer having the SSD of the first application example mounted thereon.

The personal computer 200 includes a CPU 301, north bridge 302, main memory 303, video controller 304, audio controller 305, south bridge 309, BIOS-ROM 310, SSD 10, ODD unit 311, embedded controller/keyboard controller IC (EC/KBC) 312, network controller 313 and the like.

The CPU 301 is a processor provided for controlling the operation of the personal computer 200 and executes an operating system (OS) loaded in the main memory 303 from the SSD 10. Further, when the ODD unit 311 makes it possible to perform at least one of the processes including the read process and write process with respect to a loaded optical disk, the CPU 301 performs the process.

Further, the CPU 301 executes a Basic Input/Output System (BIOS) stored in the BIOS-ROM 310. The BIOS is a program for hardware control in the personal computer 200.

The north bridge 302 is a bridge device that connects the local bus of the CPU 301 to the south bridge 309. In the north bridge 302, a memory controller that controls access to the main memory 303 is contained.

Further, the north bridge 302 has a function of making communication with the video controller 304 and making communication with the audio controller 305 via an Accelerated Graphics Port (AGP) bus 314.

The main memory 303 temporarily stores programs and data and functions as a work area of the CPU 301. The main memory 303 is configured by a RAM, for example.

The video controller 304 is a video playback controller that controls the display unit 202 used as a display monitor of the personal computer 200.

The audio controller 305 is an audio playback controller that controls a speaker 306 of the personal computer 200.

The south bridge 309 controls devices on a Low Pin Count (LPC) bus and devices on a Peripheral Component Interconnect (PCI) bus 315. Further, the south bridge 309 controls the SSD 10 that is a storage device for storing various software and data via an SAS interface (SAS I/F).

The personal computer 200 accesses the SSD 10 in the sector unit. A write command, read command, cache flash command and the like are input to the SSD 10 via the SAS interface.

Further, the south bridge 309 has a function of controlling accesses to the BIOS-ROM 310 and ODD unit 311.

The EC/KBC 312 is a single-chip microcomputer in which an embedded controller for power management and a keyboard controller for controlling the keyboard (KB) 206 and touchpad 207 are integrated.

The EC/KBC 312 has a function of turning the power source of the personal computer 200 on/off in response to the operation of the power button by the user. The network controller 313 is a communication device that makes communication with an external network such as the Internet, for example.

Next, as a second application example of the fifth embodiment, a server having an SSD mounted thereon is explained.

FIG. 17 is a conceptual view showing a server having the SSD of the second application example mounted thereon.

A server 400 is connected to the Internet 401. An SSD 10 is mounted on the server 400. A plurality of terminals, for example, computers 402 are connected to the Internet 401. The user accesses the SSD 10 in the server 400 via the Internet 401 from the computer 402. The configuration and operation of the SSD 10 are the same as those of the embodiments described before.

Next, as a third application example of the fifth embodiment, a network between personal computers each having an SSD mounted thereon is explained.

FIG. 18 is a conceptual view showing a network between personal computers each having the SSD of the third application example mounted thereon.

As shown in FIG. 18, two personal computers 200 respectively have SSDs 10. The personal computers 200 are connected via an SAS cable. The SSD 10 in the personal computer 200 is controlled via an SAS interface (SAS I/F). For example, one of the personal computers 200 is used as an initiator and the SSD 10 in the other personal computer 200 is used as a target. Then, the first to fourth embodiments are carried out.

The other configuration and operation of the personal computer 200 and SSD 10 are the same as those of the embodiments described before.

Next, as a fourth application example of the fifth embodiment, a network between a personal computer and server each having an SSD mounted thereon is explained.

FIG. 19 is a conceptual view showing a network between the server and the personal computer of the fourth application example.

As shown in FIG. 19, a personal computer 200 and server 400 each have an SSD 10. The personal computer 200 and server 400 are connected via an SAS cable. The SSDs 10 in the personal computer 200 and server 400 are controlled via an SAS interface (SAS I/F). For example, the personal computer 200 is used as an initiator and the SSD 10 in the server 400 is used as a target. Further, the server 400 is used as an initiator and the SSD 10 in the personal computer 200 is used as a target. Then, the first to fourth embodiments are carried out.

The other configuration and operation of the personal computer 200 and SSD 10 are the same as those of the embodiments described before.

As described above, according to the embodiments, electronic equipment having a storage device that can efficiently utilize a communication source and increase the data communication speed can be provided.

The application object of this embodiment is not limited to the SSD. It can be applied to the other storage device such as a Secure Digital (SD) card, multimedia card or USB flash memory, for example, electronic equipment having a storage device, for example, other electronic equipment such as a personal computer, server or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device communicable with a host device with a Serial Attached SCSI (SAS) interface, comprising:
a nonvolatile memory; and
a controller circuit including a SAS wide port, a first transport layer, and a second transport layer, the SAS wide port including a first phy and a second phy, the controller circuit configured to:
transmit a connection request from the first phy to a first host device even when a connection is established between the second phy and the first host device, the first host device being a host device to which the controller circuit is going to transmit a first frame venerated in the first transport layer; and
in a case that the connection request from the first phy is rejected, flow the first frame from the first transport layer to the second phv and transmit the first frame to the first host device using the connection established between the second phy and the first host device without retransmitting the connection request from the first phy.

2. The storage device according to claim 1, the controller circuit further including
an arbiter, wherein
the arbiter is configured to control a flow of a frame among the first phy, the second phy, the first transport layer, and the second transport layer.

3. The storage device according to claim 2, wherein
the first phy, the arbiter, and the first transport layer are connected sequentially, and
the second phy, the arbiter, and the second transport layer are connected sequentially.

4. The storage device according to claim 2, wherein
the arbiter is configured to control the flow of the frame in one of (a) between the first phy and the first transport layer, (b) between the first phy and the second transport layer, (c) between the second phy and the first transport layer, or (d) between the second phy and the second transport layer.

5. The storage device according to claim 1, wherein
the controller circuit is further configured, after the first frame is transmitted from the second phy to the first host device in a connection, not to flow a frame generated in the second transport layer to the second phy during the connection.

6. The storage device according to claim 1, wherein
when the connection request transmitted through the first phy and a connection request received from the first host device to the first phy are conflicted, the connection requests are arbitrated based on a predetermined arbitration rule.

7. The storage device according to claim 6, wherein
the controller circuit is further configured to, when the arbitration for the connection request transmitted through the first phy is lost, transmit the first frame from the second phy to the first host device.

8. The storage device according to claim 1, wherein
the nonvolatile memory is a nonvolatile semiconductor memory.

9. The storage device according to claim 1, wherein
the nonvolatile memory is a magnetic disk.

10. A method of controlling a storage device, the storage device being communicable with a host device with a Serial Attached SCSI (SAS) interface, the storage device including a nonvolatile memory and a controller circuit including a SAS wide port, a first transport layer, and a second transport layer, the SAS wide port including a first phy and a second phy, the method comprising:
transmitting a connection request from the first phy to a first host device even when a connection is established between the second phy and the first host device, the first host device being a host device to which the controller circuit is going to transmit a first frame generated in the first transport layer; and
in a case that the connection request from the first phy is rejected, flowing the first frame from the first transport layer to the second phy and transmitting the first frame to the first host device using the connection established between the second phy and the first host device without retransmitting the connection request from the first phy.

11. The method according to claim 10, wherein
the controller circuit further includes
an arbiter configured to control a flow of a frame among the first phy, the second phy, the first transport layer, and the second transport layer.

12. The method according to claim 11, wherein
the first phy, the arbiter, and the first transport layer are connected sequentially, and
the second phy, the arbiter, and the second transport layer are connected sequentially.

13. The method according to claim 11, wherein
the arbiter is configured to control the flow of the frame in one of (a) between the first phy and the first transport layer, (b) between the first phy and the second transport layer, (c) between the second phy and the first transport layer, or (d) between the second phy and the second transport layer.

14. The method according to claim 10, wherein
the controller circuit is further configured, after the first frame is transmitted from the second phy to the first host device in a connection, not to flow a frame generated in the second transport layer to the second phy during the connection.

15. The method according to claim 10, wherein
when the connection request transmitted through the first phy and a connection request received from the first host device to the first phy are conflicted, the connection requests are arbitrated based on a predetermined arbitration rule.

16. The method according to claim 15, further comprising:
when the arbitration for the connection request transmitted through the first phy is lost, transmitting the first frame from the second phy to the first host device.

17. The method according to claim 10, wherein
the nonvolatile memory is a nonvolatile semiconductor memory.

18. The method according to claim 10, wherein
the nonvolatile memory is a magnetic disk.

* * * * *